ns

(56) References Cited

U.S. PATENT DOCUMENTS

| | | | |
|---|---|---|---|
| 7,961,909 B2* | 6/2011 | Mandella | G06F 3/01 382/103 |
| 8,481,872 B2* | 7/2013 | Zachut | G06F 3/041 178/18.03 |
| 8,743,083 B2* | 6/2014 | Zanone | G06F 3/04166 345/174 |
| 9,524,060 B2* | 12/2016 | Drumm | G06F 3/0428 |
| 9,874,978 B2* | 1/2018 | Wall | G06F 3/04166 |
| 10,019,113 B2* | 7/2018 | Christiansson | G06F 3/0416 |
| 10,310,674 B2* | 6/2019 | Gilton | G06F 3/0421 |
| 10,481,737 B2* | 11/2019 | Christiansson | G06F 3/042 |
| 10,496,227 B2* | 12/2019 | Wassvik | G06F 3/0421 |
| 2004/0246105 A1* | 12/2004 | Cavallucci | H03K 17/943 340/286.01 |
| 2008/0062150 A1* | 3/2008 | Lee | G06F 1/3262 345/175 |
| 2009/0189867 A1 | 7/2009 | Krah et al. | |
| 2009/0273579 A1* | 11/2009 | Zachut | G06F 3/047 345/174 |
| 2010/0001998 A1* | 1/2010 | Mandella | G06F 3/03545 345/419 |
| 2010/0013860 A1* | 1/2010 | Mandella | A63F 13/428 345/650 |
| 2010/0155153 A1* | 6/2010 | Zachut | G06F 3/041661 178/18.03 |
| 2012/0127124 A1* | 5/2012 | Zanone | G06F 1/3262 345/174 |
| 2013/0265276 A1 | 10/2013 | Obeidat et al. | |
| 2014/0015803 A1* | 1/2014 | Drumm | G06F 3/0428 345/175 |
| 2014/0192023 A1* | 7/2014 | Hoffman | G06F 3/0421 345/175 |
| 2015/0234446 A1 | 8/2015 | Nathan et al. | |
| 2018/0210572 A1* | 7/2018 | Wallander | G06F 3/042 |

\* cited by examiner

TOUCH INPUT DETECTION

BACKGROUND

Computing devices are prevalent in the human environment. Computing devices are relied on for work, entertainment, communication, and many other purposes. Computing devices may utilize input interfaces to translate user input into data and control signals to the computing device. For example, computing devices may include touch-sensitive interfaces.

DETAILED DESCRIPTION

Figure 1:
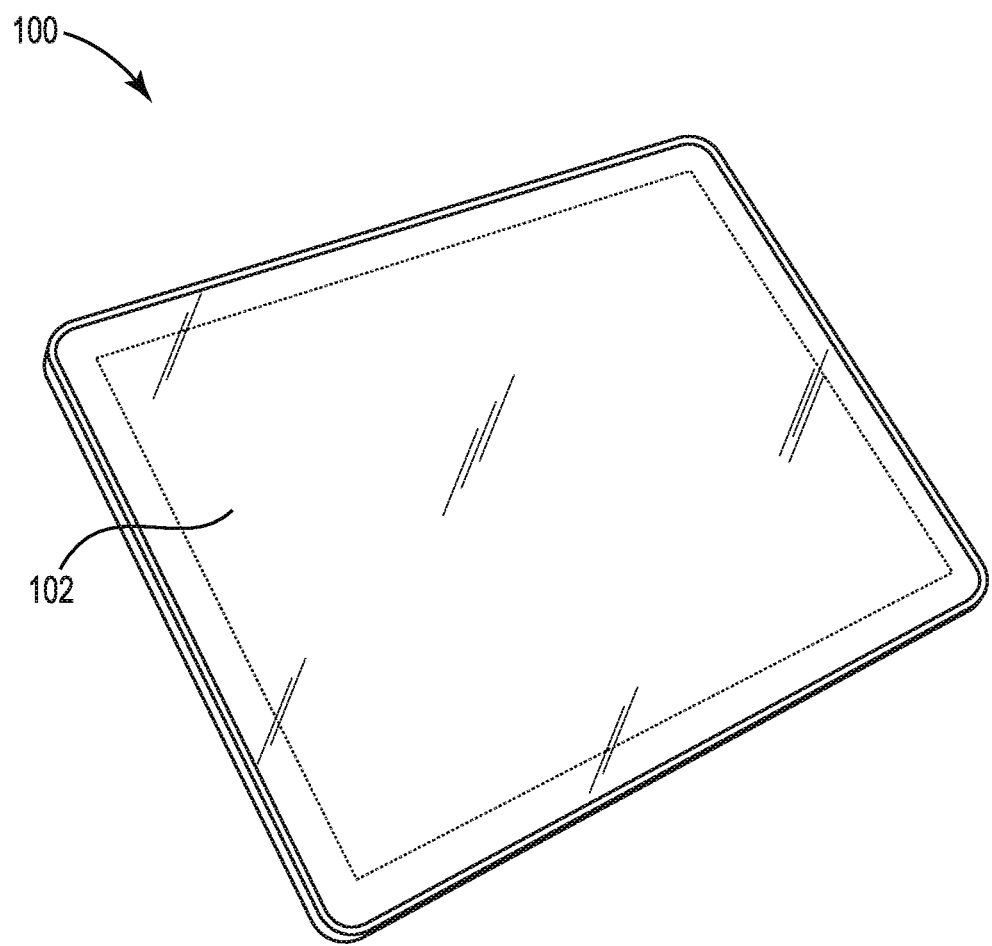
FIG. 1 illustrates an example of a computing device to perform touch input detection consistent with the disclosure.

A computing device may include a processing resource such as electronic circuitry to execute instructions stored on machine-readable medium to perform various operations. Computing devices may be static or mobile. Computing devices may include a smartphone, a gaming console, electronic voting machines, point of sale systems, automatic teller machines, an interactive display, an interactive whiteboard, a personal digital assistant, an automated industrial appliance, a smart home control system component, a smart television, a tablet, a laptop, a laptop-tablet hybrid, a handheld computer, a smart device, a desktop computer, etc.

A computing device may include an input interface. An input interface may include a device and/or a portion of a device that can receive user input and translate the user input into data and control signals for a computing device. For example, a computing device may include an input interface such as a physical keyboard with mechanically actuated buttons, a joystick able to be physically actuated into various position, and/or a physical pointing device such as a mouse or a trackball that are physically manipulated by a user.

In some examples, a computing device may include a touch-sensitive interface to accept user input. For example, the computing device may include a touchscreen or touchpad. As used herein, a touch-sensitive interface may include an interface that receives input by detecting user movement and/or user touch at or near the touch-sensitive interface. The touch sensitive interface stands in contrast to a mechanical input interface that relies on a user physically manipulating a device such as a keyboard button or a physical mouse. The touch-sensitive interface instead may, for example, translate user touch and/or movement along a touch-sensitive region overlaid over a display. That is, a touch-sensitive interface may include a touchscreen style interface that detect and translate user inputs without the benefit of a mouse, trackball, joystick, or keyboard.

A touch-sensitive interface may include a touchscreen. A touch screen may include an input and/or output device that may be layered on top of an electronic visual display (e.g., monitor) of a computing device. The touch screen may detect user input as simple or multi-touch gestures by touching on or near the screen with a stylus and/or one or more fingers. The touchscreen may facilitate a user to interact directly with what is displayed (e.g., icons on a graphical user interface (GUI) displayed by the computing device, a virtual keyboard, GUI components of instructions executing on the computing device, pictures, videos, etc.). An amount of power that a computing device consumes may be affected by the use of a touch-sensitive interface. Increased power consumption by a computing device may result in increased utility costs associated with operating the computing device and/or a decreased battery life for the computing device. A computing device utilizing a touch-sensitive interface may consume significantly more power than one that does not. For example, a computing device utilizing a touch-sensitive interface may experience twenty-five percent less operating life from a same battery supply as a computing device that is not utilizing a touch-sensitive interface. The additional battery consumption may lead some users to disable the touch-sensitive interface altogether in an attempt to preserve battery life.

In contrast, examples of the present disclosure may include computing devices, methods, and machine-readable media to perform touch input detection consistent with the disclosure. The examples may provide a power savings to a computing device while retaining a functionality of a touch sensitive interface. For example, a device may include a touch-sensitive interface, a processor, and instructions executable by the processor to cause the processor to perform operations. For example, the instructions may be executable by the processor to cause the processor to detect a period of inactivity of the touch-sensitive interface. The instructions may be executable by the processor to cause the processor to activate a one-dimensional scan for a touch input on the touch-sensitive interface in response to detecting the period of inactivity. The instructions may be executable by the processor to cause the processor to activate a two-dimensional scan for a touch input on the touch sensitive interface in response to detecting the touch input by the one-dimensional scan.

FIG. 1 illustrates an example of a computing device 100 perform touch input detection consistent with the disclosure. The computing device 100 may include a processing resource. The processing resource may include electronic circuitry within a computing device that executes instructions. The processing resource may include a central processing unit (CPU), a microprocessor, and/or an application specific integrated circuit (ASIC).

The computing device 100 may include an electronic visual display. The electronic visual display may include the electronic components associated with generating an electronic image of a graphical user interface (GUI). The electronic visual display may include, for example, an LCD panel with an LED backlight.

The computing device 100 may include a touch-sensitive interface 102. The touch-sensitive interface 102 may include a touchscreen layered over an electronic visual display. The touch-sensitive interface 102 may include an optical touchscreen panel. The touch-sensitive interface 102 may include a pane of transparent material which may be touched. A pane may include a sheet of material such as a sheet of glass. The pane may be part of an electronic display. A first surface of the pane may face away from the display and/or toward a user. The first surface of the pane may appear as though it is an outermost surface of a display. The first surface of the pane may be the surface of the pane that is accessible to be touched by a user.

A touch-sensitive interface 102 may utilize diverse mechanisms to detect user input. For example, a touch-sensitive interface 102 may utilize a resistive panel. The resistive panel may be overlaid over a display. The resistive panel may comprise several layers. Two of the layers may include thin, transparent, electrically resistive layers separated by a thin space. The two layers may face each other with a gap between. The top layer that is physically touched by a user may have a coating on the underside of its surface. Just beneath the top layer may be a similar resistive layer on top of its substrate. One layer may have conductive connections along its sides and the other along a top and bottom. A voltage may be applied to one layer and sensed by the other. When an object such as a fingertip presses down onto the outer surface, the two layers touch to become connected at that point and the panel may then behave as a pair of voltage dividers at the contact point one axis at a time. By switching between each layer, the position of a pressure on the screen can be read. The position of the touch event may be sent to a controller for processing In another example, a touch-sensitive interface 102 may utilize a surface acoustic wave over a touchscreen panel. For example, an ultrasonic wave may be passed over the panel and when the panel is touched by, for example, a fingertip the wave may be absorbed. The change in the ultrasonic wave may register the position of the touch event and send the information to a controller for processing.

In another example, a touch-sensitive interface 102 may utilize a capacitive touchscreen panel. A capacitive touchscreen panel may consist of an insulator such as glass, coated with a transparent conductor such as indium tin oxide (ITO). As the human body is also an electrical conductor, touching the surface of the screen may result in a distortion of the screens electrostatic field. Measureable as a change in capacitance. Various technologies may be used to determine the location of the touch. The location may then be sent to a controller for processing.

In yet another example, the touch-sensitive interface 102 may utilize a projected capacitive touch (PCT or PCAP) panel. A PCT touchscreen panel may include a matrix of rows and columns of conductive material layered on sheets of glass. Voltage applied to this grid may create a substantially uniform electrostatic field which can be measured. When a conductive object, such as a finger, comes into contact with a PCT touchscreen panel it may distort the local electrostatic field at that contact point. This distortion may be measureable as a change in capacitance. If a finger bridges the gap between two of the "tracks", the charge field may be further interrupted and detected by a controller. The capacitance may be changed and measured at every individual point on the grid (e.g., intersection).

In another example, the touch-sensitive interface 102 may utilize an optical touchscreen panel. The optical touchscreen panel may include an array of light emitting diode (LED) photoemitter and photodetector pairs. The photoemitters and photodetectors may emit and/or detect beams of infrared light and/or beams of light of from other portions of the electromagnetic spectrum, both visible and invisible to the human eye. The photoemitter and photodetector pairs may be arranged around the edges of a touchscreen panel and/or display. The photoemitter and photodetector pairs may be arranged around the edges of a touchscreen panel and/or display such that they form an X-Y arrayed grid with LED beams crossing each other overlaying the touchscreen in a plane parallel to the plane of the touchable surface of the touchscreen. When an object, such as a finger, passes between a photoemitter and a photodetector pair, the beam path between the two may be interrupted. The interruption of the beam may be detected by the photodetector and the location may then be sent to a controller for processing. Since the photoemitter and photodetector pairs are arranged such that the beams are arrayed in an X-Y grid over the touchscreen panel and/or display, an interruption may be detected by a first photoemitter and photodetector pair arrayed in an X direction and a second photoemitter and photodetector pair arrayed perpendicular to the first pair in a Y direction and an X-Y coordinate of the location of the touch on the touchscreen and/or display may be identified.

The touch-sensitive interface 102 may include an input sensor pair. For example, the touch-sensitive interface 102 may include an LED photoemitter and photodetector pair. The LED photoemitter may utilize an LED to emit a beam of light. A photodetector may be paired with the photoemitter. The photodetector may be aligned in the beam path of the beam emitted by the photoemitter. The photodetector may detect the arrival and/or interruption of the arrival of the beam from the photoemitter at the photodetector. As such, the photodetector may be able to detect the presence of an object, such as a finger, in the beam path between the pair. A plurality of photoemitter and photodetector pairs may be arranged along the edges of the pane. For example, each photoemitter and photodetector of a pair may be arranged on opposing edges of the pane such that the beam path between the pair traverses a portion of the first surface of the pane. The plurality of photoemitter and photodetector pairs may be arranged about the edges of the pane such that they collectively form an X-Y grid of intersecting beam paths over the first surface of the pane. That is, a first portion of the plurality of photoemitter and photodetector pairs may be arrayed along a first axis (e.g., X-axis) of a coordinate grid laid over the first face of the pane and a second portion of the plurality of photoemitter and photodetector pairs may be arrayed along a second axis (e.g., Y-axis), substantially perpendicular to the first axis, of a coordinate grid overlaid on the first face of the pane.

With the above described example arrangement of photoemitter and photodetector pairs, an object such as a finger placed on the first pane may interrupt a beam path of a photoemitter and photodetector pair aligned along an X-axis and interrupt a beam path of a photoemitter and photodetector pair aligned along a Y-axis. As such, a touch input detected by the interruption of the photoemitter and photodetector pairs' beam paths may be associated with an X-Y coordinate on the X-Y grid over the first surface of the pane.

The touch-sensitive interface 102 may detect touch inputs as described above. For example, the touch sensitive interface 102 may detect the contact and/or movement of an object with the first surface of the pane. The touch input detected by the touch-sensitive interface 102 may be sent to a controller. The controller may convert the touch input data to into data and control signals for a computing device.

The computing device 100 may include a computer readable media. The computer readable media may include a non-transitory computer readable media. The non-transitory computer readable media may include any type of volatile or non-volatile memory or storage, such as random access memory (RAM), flash memory, read-only memory (ROM), storage volumes, a hard disk, or a combination thereof.

The non-transitory computer readable media may include instructions stored thereon. The instructions may be executable by the processing resource to cause the processing resource to perform a computing operation.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

The computing device 100 may include instructions executable by the processor to cause the processor to detect a period of inactivity of the touch-sensitive interface 102. Detecting a period of inactivity may include determining that no touch input has been detected by the touch-sensitive interface for a period of time. Detecting a period of inactivity may include determining that a scan for a touch input did not detect a touch input for a period time. Detecting a period of inactivity may include determining that a two-dimensional scan for a touch input over a period of time did not result in a touch input for a period of time.

A two-dimensional scan may include periodically outputting and/or emitting a beam of light from a photoemitter in a beam path to a paired photodetector along a first axis and emitting a beam of light from a photoemitter in a beam path to a paired photodetector along a second axis substantially perpendicular to the first axis. That is, a two-dimensional scan may include periodically outputting and/or emitting a beam of light from a photoemitter in a beam path to a paired photodetector along an X-axis and emitting a beam of light from a photoemitter in a beam path to a paired photodetector along a Y-axis. The two-dimensional scan may include utilizing a plurality photoemitter and photo detector pairs arrayed in an X-Y grid over a first surface of the pane to detect a touch input at the first surface of the pane.

The two-dimensional scan may include an active scanning process of outputting and/or emitting a beam of light from a photoemitter in a beam path to a paired photodetector along an X-axis and emitting a beam of light from a photoemitter in a beam path to a paired photodetector along a Y-axis at a first scan rate. A scan rate may refer to the periodicity at which the beams of light are emitted and/or a periodicity at which photodetectors detect the beam. That is, a scan rate may refer to a rate and/or frequency of outputting and/or emitting a beam of light from a photoemitter in a beam path to a paired photodetector along an X-axis and emitting a beam of light from a photoemitter in a beam path to a paired photodetector along a Y-axis. Stated differently, the scan rate may refer to the frequency with which photodetectors and photoemitters attempt to detect touch inputs in the X-axis and Y-axis planes. A higher scan rate may correspond to a more frequent emission of a beam of light from the photoemitters, a more responsive and rapid detection of a touch input, a higher likelihood of detecting a touch input over a period of time, and a higher rate of power consumption associated with the more frequent emission of the beams of light.

The two-dimensional scan may include an active scanning process of outputting and/or emitting a beam of light from a photoemitter in a beam path to a paired photodetector along an X-axis and emitting a beam of light from a photoemitter in a beam path to a paired photodetector along a Y-axis at a first scan resolution. A scan resolution may refer to a characteristic of the light beams employed in the two-dimensional scan. For example, a scan resolution can refer to an amount of the plurality of photoemitters and photodetector pairs that are outputting and/or emitting beams of light during a portion of the two-dimensional scan. The scan resolution may also refer to the width of, pattern of, and/or intensity of a beam emitted by the plurality of photoemitters and photodetector pairs. A higher scan resolution may refer to the utilization of relatively more of the plurality of photoemitters and photodetector pairs during a two-dimensional scan. A higher scan resolution may correspond to a more responsive and rapid detection of a touch input, a higher likelihood of detecting a touch input over a period of time, a more precise identification of the X-Y coordinates of a touch input, and a higher rate of power consumption associated with the greater amount of light beam emitting photoemitter and photodetector pairs.

Detecting a period of inactivity may include determining that the two-dimensional scan for a touch input at a first scan rate and at a first scan resolution over a period of time did not result in a touch input for a period of time. For example, the computing device 100 may perform a two-dimensional scan utilizing the touch-sensitive interface 102 at a first rate and a first resolution. The computing device 100 may detect that no touch input was detected for a period of time such as three minutes of two-dimensional scanning. That is, the computing device 100 may determine that the touch-sensitive interface was not touched by a user during the preceding three minutes of two-dimensional scanning of the touch-sensitive interface 102.

The computing device 100 may include instructions executable by the processor to cause the processor to activate a one-dimensional scan for a touch input on the touch-sensitive interface 102. The computing device 100 may activate a one-dimensional scan of a touch input in response to detecting the period of inactivity. For example, the computing device 100 may determine that the touch-sensitive interface was not touched by a user during a preceding period of time of two-dimensional scanning of the touch-sensitive interface 102. In response to determining that no touch input was detected during the time period of two-dimensional scanning the computing device 100 may switch the computing device 100 into a detection mode. The detection mode may be a power saving mode. The detection mode may offer a savings over the two-dimensional scan operations by activating operation of the touch-sensitive interface 102 with a one-dimensional scan.

Activating a one-dimensional scan may include utilizing active scanning process of outputting and/or emitting a beam of light from a photoemitter in a beam path to a paired photodetector along one of an X-axis or a Y-axis. In contrast to the two-dimensional scan, the one dimensional scan may include scanning along on dimension or axis of the touch-sensitive interface 102. The computing device 100 may refrain from outputting and/or emitting a beam of light from a photoemitter and photodetector pair that is aligned along a second axis substantially perpendicular to the axis of the beam path of the photoemitter and photodetector pair that is being utilized in the one-dimensional scan. Since the one-dimensional scan may emit and/or detect beams of light along one axis of an X-Y grid and not the other, the controller and/or computing device 100 may receive a coordinate and/or coordinates of one axis and not the other. In an example where the one-dimensional scan is performed along the X-axis and not the Y-axis, an X-axis coordinate or coordinates of the touch input may be detected and or sent to the controller, but not a Y-axis coordinate since the Y-axis photoemitter and photodetector pairs are not operated and the Y-axis coordinate data is not collected in such an example. In another example, the one-dimensional scan may be performed along the Y-axis and not the X-axis The computing device 100 may select the portion of the plurality of the photoemitter and photodetector pairs that may be utilized in a one-dimensional scan. For example, the computing device 100 may select the portion of the plurality of the photoemitter and photodetector pairs that are aligned along the X-axis for utilization and exclude those aligned along the Y-axis from utilization in the one dimensional scan. Alternatively, the computing device 100 may select the portion of the plurality of the photoemitter and photodetector pairs that are aligned along the Y-axis for utilization and exclude those aligned along the X-axis from utilization in the one dimensional scan.

The computing device 100 may select an axis along which to scan to the exclusion of other axes resulting in a one-dimensional one-axis scan. The selection of the portion of the plurality of the photoemitter and photodetector pairs and/or the axis along which to scan may be based on characteristics of the touch-sensitive interface 102. For example, the selection of the portion of the plurality of the photoemitter and photodetector pairs and/or the axis along which to scan may be based on the dimensions of the touch-sensitive interface 102 and/or the amount of photoemitter and photodetector pairs associated with each axis of the touch-sensitive interface. For example, the computing device may select to perform the one-dimensional scan along the Y-axis. In such an example, the one-dimensional scan along the Y-axis may utilize the photoemitter and photodetector pairs aligned along opposing edges of the touch-sensitive interface 102. The photoemitter and photodetector pairs aligned along opposing edges of the touch-sensitive interface 102 may have beam paths aligned along a Y-axis. The selection of these photoemitter and photodetector pairs may be based on a determination that the length of the opposing edges of the touch-sensitive interface 102 that the photoemitter and photodetector pairs are arranged on is less than the same dimension of the perpendicular top and bottom edges of the touch-sensitive interface 102. The perpendicular top and bottom edges of the touch-sensitive interface 102 may be the edges along which X-axis aligned photoemitter and photodetector pairs are present.

Similarly, the computing device 100 may select to perform the one-dimensional scan along the Y-axis. In such an example, the one-dimensional scan along the Y-axis may utilize the photoemitter and photodetector pairs aligned on opposing edges of the touch-sensitive interface 102. The photoemitter and photodetector pairs aligned along opposing edges of the touch-sensitive interface 102 may have beam paths aligned along a Y-axis. The selection of these photoemitter and photodetector pairs may be based on a determination that fewer photoemitter and photodetector pairs are present along the opposing edges than are present along the perpendicular top and bottom edges of the touch-sensitive interface 102. The perpendicular top and bottom edges of the touch-sensitive interface 102 may be the edges along which X-axis aligned photoemitter and photodetector pairs are present.

The examples of one-dimensional scans described above may produce a power saving over the two-dimensional scan for the computing device 100 and may even extend battery life for the computing device 100 in examples where the computing device relies on a battery for power. For example, a one-dimensional scan of the touch sensitive interface 102 may limit power utilization to powering the photoemitter and photodetector pairs that are aligned along a single axis of the touch-sensitive interface 102. For example, the one-dimensional scan may produce a power savings by operating half or fewer of the photoemitter and photodetector pairs available for utilization in an active scan.

While the rate and/or resolution of the two-dimensional scan may be adjusted downward in order to conserve power, utilizing the one-dimensional scan may produce a greater power savings and retain a greater responsiveness and touch input detection rate than the adjusted two-dimensional scan. For example, while the rate and resolution of the two-dimensional scan may be revised lower, the two-dimensional scan still involves the use of more photoemitter and photodetector pairs overall since the two-dimensional scan is attempting to identify an X-axis coordinate and a Y-axis coordinate of a touch input. In contrast, the one-dimensional scan forgoes even attempting to collect one entire axis worth of information. Further, a decrease in the rate or resolution of the two-dimension scan may decrease the coverage and/or frequency of coverage for detection of a touch-input over the touch-sensitive interface 102 since the photoemitter and photodetector pairs may be utilized with less frequency and with less coverage. In contrast, substantially the entire touch-sensitive interface 102 may remain under scan for a touch input during the one-dimensional scan, albeit in a single axis.

The one-dimensional scan may be performed at a second scan rate and/or a second scan resolution. The second scan rate and the second scan resolution of the one-dimensional scan may be the same as or different than the first scan rate and the first scan resolution of a two-dimensional scan. In some examples, the second scan rate and/or the second scan resolution of the one-dimensional scan may be lower than the first scan resolution and/or the first scan rate of the two-dimensional scan. In some examples, a first optical beam pattern may be utilized by the photoemitters during the one-dimensional scan and a second optical beam pattern may be utilized by the photoemitters during the two-dimensional scan. The first and/or the second scan resolution may be a configurable setting available for manipulation by a user of the computing device 100.

As described above, when the computing device 100 is utilizing a one-dimensional scan a coordinate pair, such as an X-Y coordinate pair, will not be detected and/or collected, rather data from one axis may be detected and/or collected. For example, when the one-dimensional scan utilizes photoemitter and photodetector pairs aligned along a Y-axis and not those aligned along an X-axis, the computing device 100 may detect and/or collect data associated with the touch input from the photoemitter and photodetector pairs aligned along a Y-axis but not those aligned along an X-axis. As such, the touch input may be detected as having occurred at the touch-sensitive interface 102 and/or an identifier of a location of the touch on the touch-sensitive interface 102 with respect to a single axis and not another of the touch sensitive interface 102.

A computing device 100 may not be able to identify a precise location of the touch-sensitive user interface 102 where a touch input was detected utilizing the one-dimensional scan. Therefore, the computing device 100 may not be able to identify precisely to which portion of the graphical user interface or computing action a touch input refers. Instead, a touch input detected by a one-dimensional scan may operate as an instruction to the computing device to activate a two-dimensional scan mode.

The computing device 100 may include instructions executable by the processor to cause the processor to activate a two-dimensional scan for a touch input on the touch sensitive interface 102. The activation of the two-dimensional scan may be in response to a detection of a touch input by the one dimensional scan. Activating the two-dimensional scan may include initiating an active scanning process including outputting and/or emitting a beam of light from a photoemitter in a beam path to a paired photodetector along an X-axis and emitting a beam of light from a photoemitter in a beam path to a paired photodetector along a Y-axis at the first scan rate and the first scan resolution.

The switch from the one-dimensional scan to the two-dimensional scan may occur rapidly. For example, the switch from the one-dimensional scan to the two-dimensional scan may occur within fifteen milliseconds. Therefore, a touch input that is detected with a one dimensional scan will most likely still be occurring after the computing device 100 has switched to performing a two-dimensional scan. The computing device 100 may then rescan and/or detect the same touch input that triggered the switch to a two-dimensional scan. Whereas the one-dimensional scan of the touch input may only detect the location of the touch input relative to a single axis, the two-dimensional scan may detect both the X-axis and Y-axis position of the touch input. Therefore, the computing device 100 may identify a precise location of the touch-sensitive interface 102 where the touch input was detected utilizing the two-dimensional scan. The computing device 100 may identify the precise portion of the graphical user interface or computing action of the touch input during the two-dimensional scan.

Since the one-dimensional scan utilizes less power than the two-dimensional scan, the computing device 100 may conserve power by operating the touch-sensitive interface 102 utilizing the one-dimensional scan and switching to the higher power consuming two-dimensional scan once a touch input has been detected. Moreover, since the switch from the one-dimensional scan to the two-dimensional scan occurs rapidly enough to rescan the touch input in the two-dimensional mode and collect the full X-Y coordinate positional data for the touch input to be utilized by the computing device 100. That is, despite experiencing the power savings associated with operating the touch-sensitive interface 102 utilizing a one-dimensional scan there is no loss of resolution in detecting the touch inputs detectable by a user.

As described above, the computing device 100 may, after activating the two-dimensional scan, begin monitoring a time that has elapsed from the last touch input detected by the two-dimensional scan. As soon as a preset amount of time has elapsed since the last touch input was detected by the two-dimensional scan, the computing device 100 may switch back into the one-dimensional scan in order to preserve battery. The elapsed time since the last touch input may be reset every time a new touch input is detected by the two-dimensional scan. Operating the touch-sensitive interface 102 utilizing a one-dimensional scan may produce a power savings of approximately fifty percent, taking power consumption from 60-100 milliwatts utilizing a two-dimensional scan to 30 milliwatts utilizing a one-dimensional scan.

Figure 2:
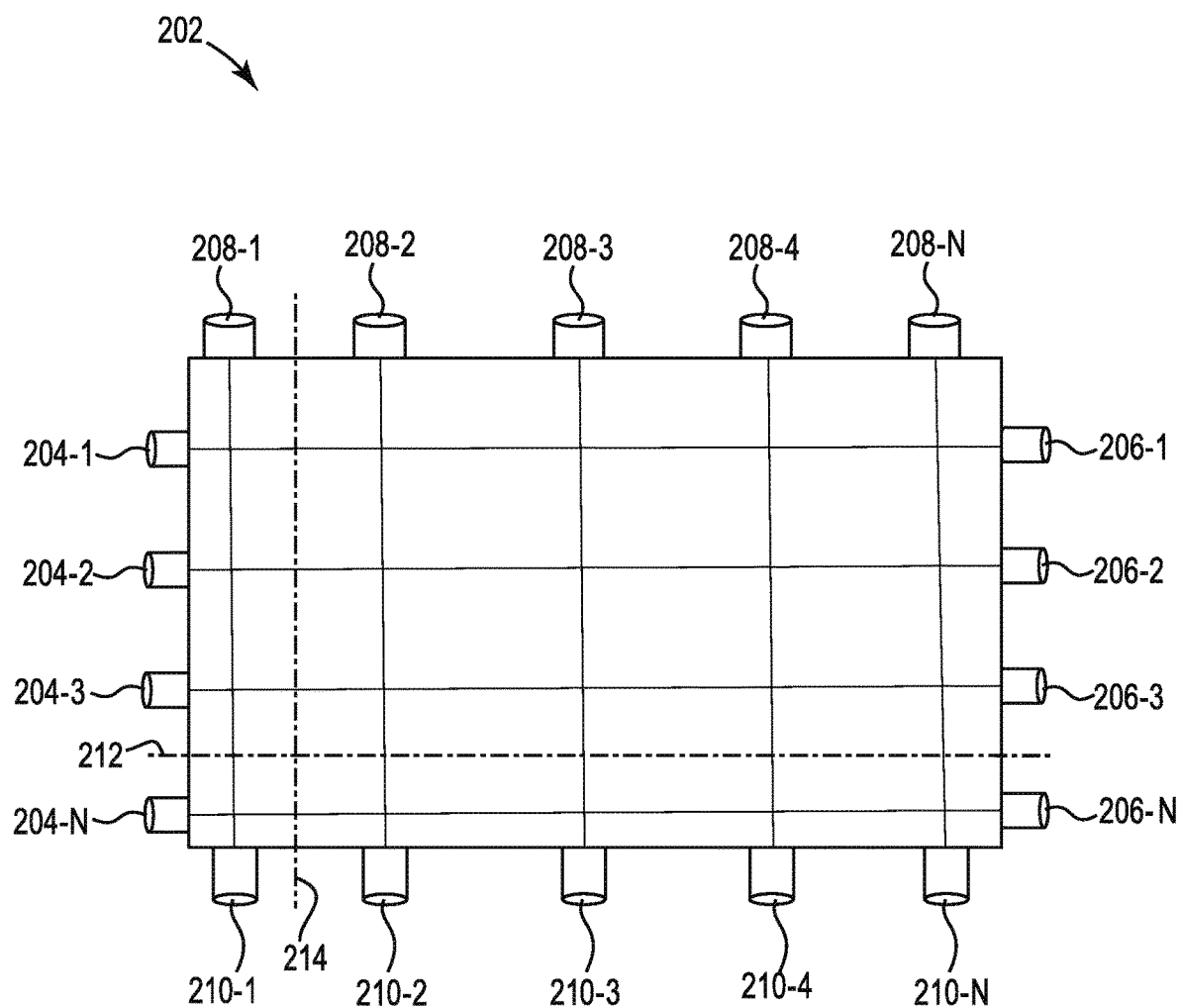
FIG. 2 illustrates an example of a touch-sensitive interface utilizing a two-dimensional scan consistent with the disclosure.

FIG. 2 illustrates a touch-sensitive interface 202 utilizing a two-dimensional scan consistent with the disclosure. The touch-touch sensitive interface may include a plurality of LED photoemitters 204-1 . . . 204-N and 208-1 . . . 208-N. The touch-sensitive interface 202 may include a plurality of photodetectors 206-1 . . . 206-N and 210-1 . . . 210-N. The LED photoemitters 204-1 . . . 204-N and 208-1 . . . 208-N and the plurality of photodetectors 206-1 . . . 206-N and 210-1 . . . 210-N may be arranged around the outside edge of the touch-sensitive interface 202. The LED photoemitters 204-1 . . . 204-N and 208-1 . . . 208-N and the plurality of photodetectors 206-1 . . . 206-N and 210-1 . . . 210-N may be arranged in pairs of a photoemitter (e.g., 208-1) and a photodetector (e.g., 210-1) positioned across from one another relative to the touch-sensitive interface 202 such that a beam of light (illustrated as a solid line between the two) emitted from the photoemitter traverses the face of the touch-sensitive interface 202 and is detected by its paired photodetector.

A first portion of the photoemitter and photodetector pairs 204-1 . . . 204-N and 206-1 . . . 206-N may be arranged such that the light beam emitted from a photoemitter to its paired photodetector is aligned along a first axis 212 (e.g., X-axis) relative to the face of the touch-sensitive interface 202. A second portion of the photoemitter and photodetector pairs 208-1 . . . 208-N and 210-1 . . . 210-N may be arranged such that the light beam emitted from a photoemitter to its paired photodetector is aligned along a second axis 214 (e.g., Y-axis) relative to the face of the touch-sensitive interface 202.

Utilizing a two-dimensional scan may include utilizing the first portion of the photoemitter and photodetector pairs 204-1 . . . 204-N and 206-1 . . . 206-N and the second portion of the photoemitter and photodetector pairs 208-1 . . . 208-N and 210-1 . . . 210-N to detect a touch input on the touch-sensitive interface 202 interrupting one of the light beams being transmitted between the pairs. The touch input may be identified along with a coordinate corresponding to the first axis 212 and a coordinate corresponding to the second axis 214. For example, the touch input may be identified along with an X-Y coordinate pair identifying the location of the touch input on the touch-sensitive interface 202. The two-dimensional scan may be an active scan to detect a touch input utilizing photoemitter and photodetector pairs scanning from substantially perpendicular edges to form a detection grid across the face of the touch-sensitive interface.

Figure 3:
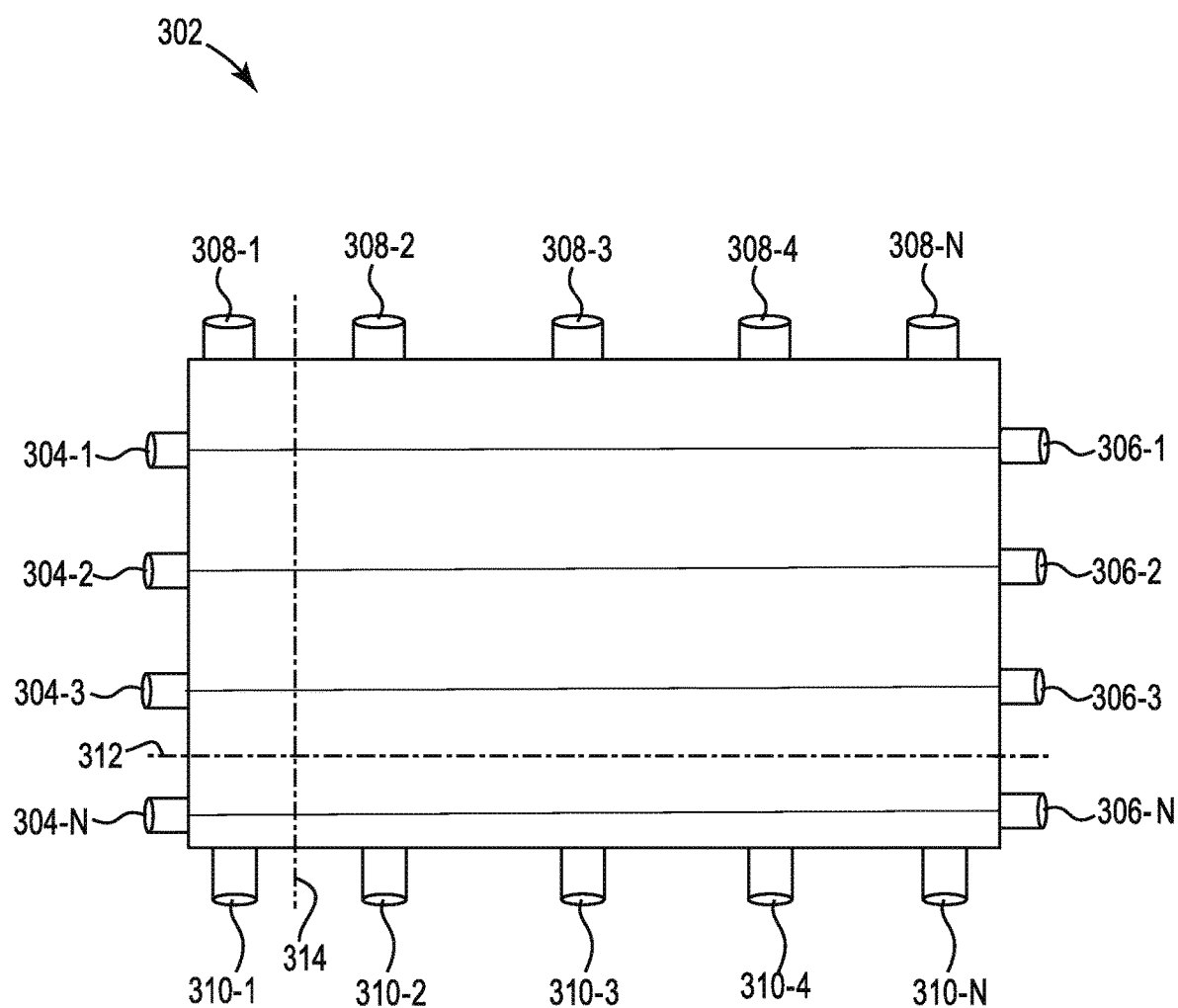
FIG. 3 illustrates an example of a touch-sensitive interface utilizing a one-dimensional scan consistent with the disclosure.

FIG. 3 illustrates a touch-sensitive interface 302 utilizing a one-dimensional scan consistent with the disclosure. The touch-touch sensitive interface may include a plurality of LED photoemitters 304-1 . . . 304-N and 308-1 . . . 308-N. The touch-sensitive interface 302 may include a plurality of photodetectors 306-1 . . . 306-N and 310-1 . . . 310-N. The LED photoemitters 304-1 . . . 304-N and 308-1 . . . 308-N and the plurality of photodetectors 306-1 . . . 306-N and 310-1 . . . 310-N may be arranged around the outside edge of the touch-sensitive interface 302. The LED photoemitters 304-1 . . . 304-N and 308-1 . . . 308-N and the plurality of photodetectors 306-1 . . . 306-N and 310-1 . . . 310-N may be arranged in pairs of a photoemitter (e.g., 308-1) and a photodetector (e.g., 310-1) positioned across from one another relative to the touch-sensitive interface 302 such that a beam of light (illustrated as a solid line between the two) emitted from the photoemitter traverses the face of the touch-sensitive interface 302 and is detected by its paired photodetector.

A first portion of the photoemitter and photodetector pairs 304-1 . . . 304-N and 306-1 . . . 306-N may be arranged such that the light beam emitted from a photoemitter to its paired photodetector is aligned along a first axis 312 (e.g., X-axis) relative to the face of the touch-sensitive interface 302. A second portion of the photoemitter and photodetector pairs 308-1 . . . 308-N and 310-1 . . . 310-N may be arranged such that the light beam emitted from a photoemitter to its paired photodetector is aligned along a second axis 314 (e.g., Y-axis) relative to the face of the touch-sensitive interface 302.

Utilizing a one-dimensional scan may include utilizing the first portion of the photoemitter and photodetector pairs 304-1 . . . 304-N and 306-1 . . . 306-N, but not the second portion of the photoemitter and photodetector pairs 308-1 . . . 308-N and 310-1 . . . 310-N, to detect a touch input on the touch-sensitive interface 302 interrupting one of the light beams being transmitted between the pairs. The touch input may be identified along with a coordinate corresponding to the first axis 312, but not a coordinate corresponding to the second axis 314. For example, the touch input may be identified along with an X coordinate identifier associated with the location of the touch input on the touch-sensitive interface 302, but not a Y coordinate identifier since the portion of the photoemitter and photodetector pairs 308-1 . . . 308-N and 310-1 . . . 310-N that collect Y coordinate identifiers are not utilized in the illustrated examples of a one-dimensional scan.

Figure 4:
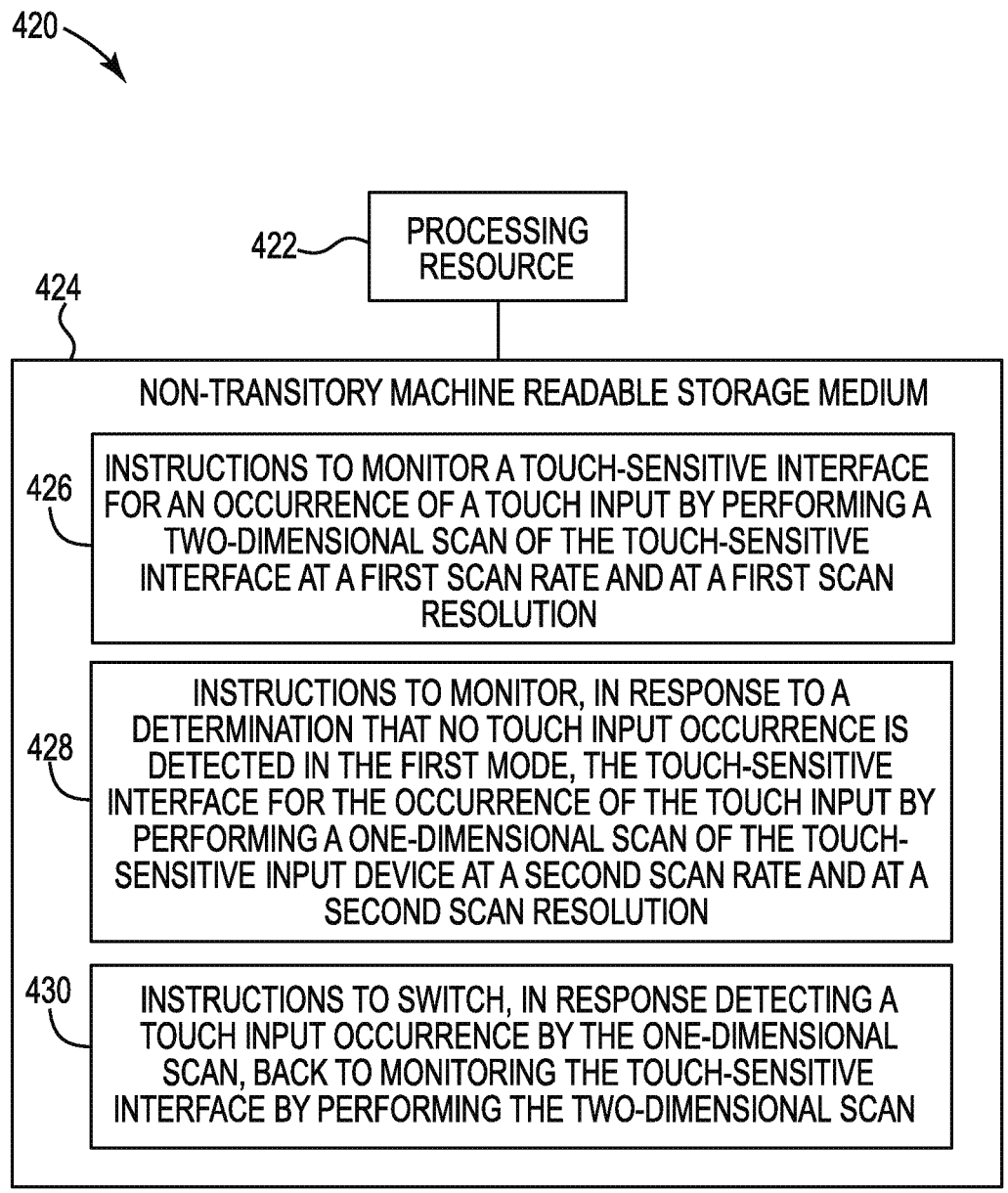
FIG. 4 illustrates a diagram of an example of a processing resource and a non-transitory computer readable medium for touch input detection consistent with the disclosure.

FIG. 4 illustrates a diagram 420 of an example of a processing resource 422 and a non-transitory machine readable medium 424 to perform touch input detection consistent with the disclosure. A memory resource, such as the non-transitory machine readable medium 424, may be used to store instructions (e.g., 426, 428, 430) executed by the processing resource 422 to perform the operations as described herein. A processing resource 422 may execute the instructions stored on the non-transitory machine readable medium 424. The non-transitory machine readable medium 424 may be any type of volatile or non-volatile memory or storage, such as random access memory (RAM), flash memory, read-only memory (ROM), storage volumes, a hard disk, or a combination thereof.

The example medium 424 may store instructions 426 executable by the processing resource 422 to monitor a touch-sensitive interface for an occurrence of a touch input. Monitoring a touch-sensitive interface may include monitoring the surface of a touch-sensitive interface using utilizing an optical scan of the surface and detecting a touch input by detecting an interruption in the beam path of the optical components.

Monitoring the touch-sensitive interface for the occurrence of a touch input may include monitoring the touch-sensitive interface utilizing a two-dimensional scan of the touch-sensitive interface. The two-dimensional scan may be performed at a first scan rate and at a first scan resolution. Performing the two-dimensional scan may include scanning, using a beam of light transmitted between LED photoemitters and photodetectors, the touch-sensitive interface along an x-axis and along a y-axis perpendicular to the x-axis. The two-dimensional scan may be utilized to detect the occurrence of a touch input and/or to determine an X-Y coordinate of the touch input occurrence on a virtual X-Y grid overlaying the touch-sensitive interface and corresponding to X-axis aligned and Y-axis aligned LED photoemitters and photodetectors.

The example medium 424 may store instructions 428 executable by the processing resource 422 to monitor the touch-sensitive interface for the occurrence of the touch input by performing a one-dimensional scan of the touch-sensitive input interface. The one-dimensional scan may be performed at a second scan rate and a second resolution. The second scan rate and/or the second scan resolution may be lower than the first scan rate and the first scan resolution associated with the two-dimensional scan.

Changing from monitoring the touch-sensitive interface with a two-dimensional scan to monitoring the touch-sensitive interface with a one-dimensional scan may be performed in response to a determination that no touch input occurrence was detected with the two-dimensional scan. For example, changing from monitoring the touch-sensitive interface with a two-dimensional scan to monitoring the touch-sensitive interface with a one-dimensional scan may be performed in response to a determination that no touch input occurrence was detected by the two-dimensional scan within a period of time of utilizing the two-dimensional scan. In this manner, the default may be to initially detect touch input occurrences with the one-dimensional scan to reduce power consumption. The touch-sensitive interface may continue to utilize the two-dimensional scan in circumstances where touch inputs occurrences are substantially continuously detected in the two-dimensional scan mode.

Performing the one-dimensional scan may include scanning, using a beam of light transmitted between LED photoemitters and photodetectors, the touch-sensitive interface along a single one of the X-axis and the Y-axis without determining the X-Y coordinate of the touch input occurrence. The one-dimensional scan may be utilized to detect the occurrence of a touch input and/or to determine a single one of an X coordinate or a Y coordinate of the touch input occurrence on a virtual X-Y grid overlaying the touch-sensitive interface and corresponding to X-axis aligned and Y-axis aligned LED photoemitters and photodetectors.

The example medium 424 may store instructions 430 executable by the processing resource 422 to switch back from monitoring the touch-sensitive interface by utilizing a one-dimensional scan to monitoring the touch-sensitive interface by utilizing the two-dimensional scan. The two-dimensional scan may, again, be performed the first scan rate and the first scan resolution.

The switch back to the two-dimensional scan may be performed responsive to detecting a touch input occurrence utilizing the one-dimensional scan. That is, the touch-sensitive interface may operate in the one-dimensional scan mode until a touch input is detected triggering the switch back to the two-dimensional mode. The detection of a touch input occurrence in the one-dimensional scan mode may not identify the X-Y coordinates of the touch input since data for one of the coordinates was not collected in the scan. As such, the detection of a touch input occurrence in the one-dimensional scan mode may not be utilized by a computing device to position a cursor or pointer or to perform an operation visible on the displayed GUI, but may be utilized strictly to trigger the switch back to the two-dimensional scan. The switch to the two-dimensional scan may occur in fewer than fifteen milliseconds. As a result, the touch input occurrence will likely still be present at the touch-sensitive interface upon initiation of a two-dimensional scan. The follow up two dimensional scan of the same touch input occurrence may collect the multi-axis coordinates of the touch input that will then be utilized to position a cursor or pointer or to perform an operation visible on the displayed GUI.

Subsequent to the switch back to monitoring the touch-sensitive interface by performing the two-dimensional scan, a timer may be started. The purpose of the time may be to monitor the time that has elapsed since the last intervening touch input occurrence detected by the two-dimensional scan. The timer may count down or up to a preset time limit. The expiration of the timer without a two-dimensional scan detection of an intervening touch input occurrence may trigger a switch back to monitoring the touch-sensitive interface utilizing the one-dimensional scan. The duration of the time may be a user-adjustable setting. For example, a menu and/or setting option for the touch-sensitive interface ay be accessible that allows a user to adjust the amount of time that is allowed to lapse during a two-dimensional scan mode before a switch to a one-dimensional scan mode is triggered. The menu and/or setting option may provide information regarding the power savings and/or battery life extension associated with each adjustment to the timer. Additionally, the timer may be adjusted based on user selectable and/or preconfigured power saving modes that may also control settings such as backlight brightness, LCD panel activity, sleep modes, etc.

Figure 5:
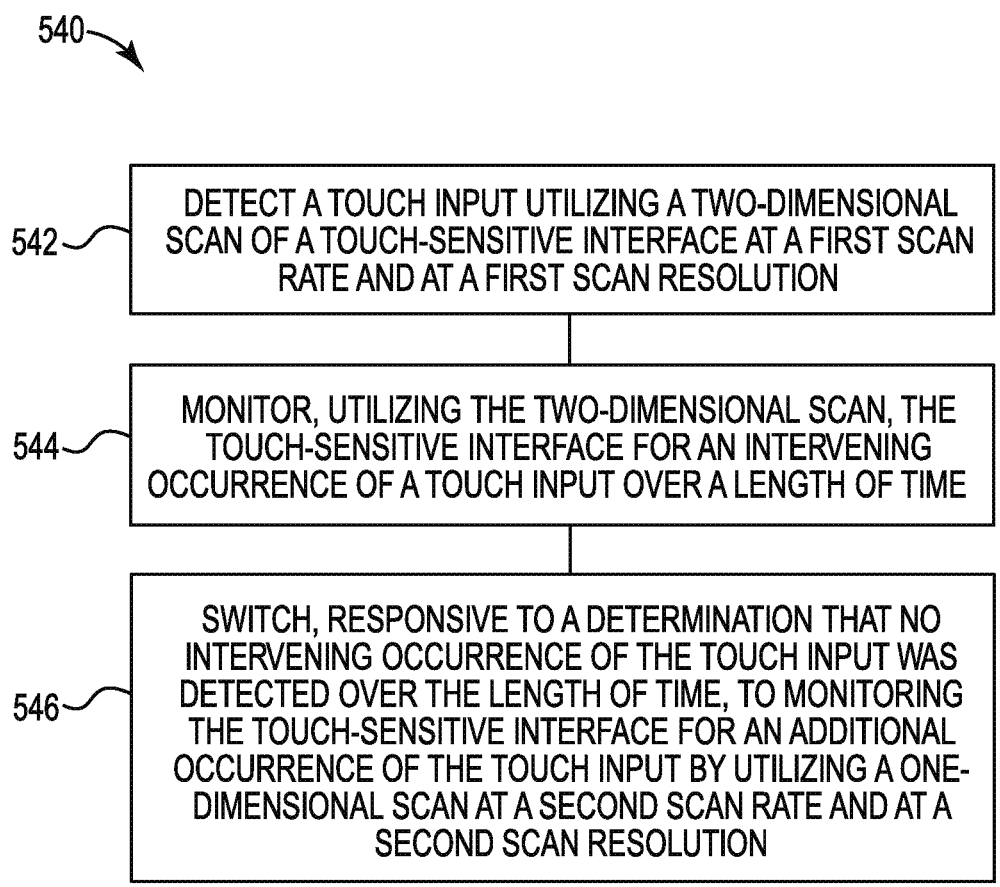
FIG. 5 illustrates a flow diagram of a method for touch input detection consistent with the disclosure.

FIG. 5 illustrates a flow diagram of an example of a method 540 to perform touch input detection consistent with the disclosure. At 542, the method 540 may include detecting a touch input at a touch-sensitive interface. The touch input may be detected utilizing a two-dimensional scan of the touch-sensitive interface. A two-dimensional scan of the touch-sensitive interface may include a multi-axis determination of the location of a touch input at a touch-sensitive interface. That is, the two-dimensional scan of the touch-sensitive interface may utilize touch input detectors that are arrayed around the touch sensitive interface such that touch input detectors with perpendicular detection areas may detect a touch event from multiple angles to identify the location of the touch input on the touch-sensitive interface. The two-dimensional scan may be performed at a first scan rate and at a first scan resolution.

At 544, the method 540 may include monitoring, utilizing the two-dimensional scan, the touch-sensitive interface for an intervening occurrence of a touch input over a length of time. The touch input occurrence may be intervening in the sense that it occurs between the most recent detected occurrence detected by the two-dimensional scan and the expiration of the length of time.

The length of time for monitoring utilizing the two-dimensional scan may be reset in response to detecting an intervening occurrence of a touch input within the length of time. That is, the length of time may be allowed to completely elapse without an intervening occurrence of a touch input before the switch to utilizing a one-dimensional scan. With each intervening occurrence of a touch input the length of time is not paused or allowed to continue, but rather it resets to its original value.

At 546, the method 540 may include switching from monitoring the touch-sensitive interface for an additional occurrence of a touch input by utilizing a two-dimensional scan to monitoring the touch sensitive interface utilizing a one-dimensional scan. Switching to monitoring the touch-sensitive interface utilizing a one-dimensional scan may be performed in response to a determination that no intervening occurrence a touch input was detected over the length of time of two-dimensional scanning described above. The two dimensional scan may be performed at a second scan rate and at a second scan resolution which is lower than the first scan rate and first scan resolution associated with the two-dimensional scan. That is, a computing device may switch to a one-dimensional scan of a touch-sensitive interface in the absence of detected touch inputs during the two-dimensional scan.

The method 540 may include switching back to monitoring the touch-sensitive interface utilizing the two-dimensional scan in response to detecting the additional occurrence. That is, if an additional touch input is detected during the one-dimensional scan, the computing device may revert back to utilizing the two dimensional scan of the touch-sensitive interface. Since the one-dimensional scan may not identify a location (e.g., identifiable with X-Y coordinates) of the touch input since less than all the data involved with making such a determination is collected, the computing device may rescan the additional occurrence utilizing a two-dimensional scan. The two-dimensional scan may identify the location of the additional touch input and the operations associated with the touch input and its X-Y location may be executed at that point by the computing device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. A "plurality of" is intended to refer to more than one of such things.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the disclosure. As used herein, the designator "N", particularly with respect to reference numerals in the drawings, indicates that a plurality of the particular feature so designated can be included with examples of the disclosure. The designators can represent the same or different numbers of the particular features. In addition, the proportion and the relative scale of the elements provided in the figures are intended to illustrate the examples of the disclosure, and should not be taken in a limiting sense. Further, as used herein, "a", "a number of", and/or "a plurality of" an element and/or feature can refer to one or more of such elements and/or features.

What is claimed:

1. A computing device comprising:
   a touch-sensitive interface;
   a plurality of photoemitter and photodetector pairs arranged around edges of the touch-sensitive interface such that the plurality of photoemitter and photodetector pairs form a virtual X-Y arrayed grid overlaying the touch-sensitive interface;
   a processing resource; and
   instructions executable by the processor to cause the processor to:
   detect a period of inactivity of the touch-sensitive interface;
   activate a one-dimensional scan using a particular portion of the plurality of photoemitter and photodetector pairs for a touch input on the touch-sensitive interface using a first optical beam pattern in response to detecting the period of inactivity;
   detect an occurrence of the touch input and determine an X coordinate or a Y coordinate of the touch input occurrence on the virtual X-Y arrayed grid overlaying the touch-sensitive interface; and
   activate a two-dimensional scan for the touch input on the touch sensitive interface using a second optical beam pattern different than the first optical beam pattern in response to detecting the occurrence of the touch input by the one-dimensional scan;

collect multi-axis coordinates of the touch input during the two-dimensional scan; and utilize the multi-axis coordinates to perform an operation visible on an associated graphical user interface.

2. The device of claim 1, wherein the touch-sensitive interface is a touchscreen layered on an electronic visual display.

3. The device of claim 1, including instructions executable by the processor to cause the processor to perform the one-dimensional scan at a lower scan rate than a scan rate of the two-dimensional scan.

4. The device of claim 1, including instructions executable by the processor to cause the processor to perform the one-dimensional scan at a lower scan resolution than a scan resolution of the two-dimensional scan.

5. The device of claim 1, wherein the touch-sensitive interface utilizes a plurality of optical beams including the particular portion of the plurality of photoemitter and photodetector pairs to detect the touch input.

6. The device of claim 1, including instructions executable by the processor to cause the processor to output the first optical beam pattern during the one-dimensional scan and the second optical beam pattern during the two-dimensional scan.

7. The device of claim 1, including instructions executable by the processor to cause the processor to perform the two-dimensional scan by outputting a first portion of the plurality of optical beams aligned along a first axis of the X-Y arrayed grid and outputting a second portion of the plurality of optical beams aligned along a second axis of the X-Y arrayed grid substantially perpendicular to the first axis.

8. The device of claim 1, including instructions executable by the processor to cause the processor to perform the one-dimensional scan by outputting a first portion of the plurality of optical beams aligned along a first axis of the X-Y arrayed grid and refraining from outputting a second portion of the plurality of optical beams aligned along a second axis of the X-Y arrayed grid substantially perpendicular to the first axis.

9. A non-transitory computer-readable medium containing instructions executable by a processing resource to cause the processor to:

monitor a touch-sensitive interface, using a plurality of photoemitter and photodetector pairs arranged around edges of the touch-sensitive interface such that the plurality of photoemitter and photodetector pairs form a virtual X-Y arrayed grid overlaying the touch-sensitive interface, for an occurrence of a touch input by performing a two-dimensional scan of the touch-sensitive interface at a first scan rate and at a first scan resolution;

monitor, in response to a determination that no touch input occurrence is detected with the two-dimensional scan, the touch-sensitive interface for the occurrence of the touch input by performing a one-dimensional scan of the touch-sensitive input interface using a particular portion of the plurality of photoemitter and photodetector pairs and a first optical beam pattern at a second scan rate and at a second scan resolution;

detect, during the one-dimensional scan, an occurrence of the touch input and determine an X coordinate or a Y coordinate of the touch input occurrence on the virtual X-Y grid overlaying the touch-sensitive interface;

switch, in response detecting the touch input occurrence by the one-dimensional scan, back to monitoring the touch-sensitive interface by performing the two-dimensional scan using a second optical beam pattern different than the first optical beam pattern;

collect multi-axis coordinates of the touch input during the two-dimensional scan; and utilize the multi-axis coordinates to perform an operation visible on an associated graphical user interface.

10. The non-transitory computer readable medium of claim 9, comprising instructions executable by a processing resource to:

perform the two-dimensional scan by scanning the touch-sensitive interface along an x-axis of the virtual X-Y grid and along a y-axis of the virtual X-Y grid perpendicular to the x-axis to determine an X-Y coordinate of the touch input occurrence.

11. The non-transitory computer readable medium of claim 9, comprising instructions executable by a processing resource to start, subsequent to the switch back to monitoring the touch-sensitive interface by performing the two-dimensional scan, a timer, wherein the expiration of the timer without a detection of an intervening touch input occurrence triggers a switch back to monitoring the touch-sensitive interface by performing the one-dimensional scan.

12. The non-transitory computer readable medium of claim 11, wherein the timer is a user-adjustable setting.

13. A method comprising:

detecting, using a plurality of photoemitter and photodetector pairs arranged around edges of a touch-sensitive interface such that the plurality of photoemitter and photodetector pairs form a virtual X-Y arrayed grid overlaying the touch-sensitive interface, a touch input utilizing a two-dimensional scan of the touch-sensitive interface at a first scan rate and at a first scan resolution using a first optical beam pattern;

determining an X-Y coordinate of the touch input occurrence on the virtual X-Y arrayed grid overlaying the touch-sensitive interface by scanning the touch-sensitive interface along an x-axis and along a y-axis perpendicular to the x-axis;

collecting multi-axis coordinates of the touch input during the two-dimensional scan;

utilizing the multi-axis coordinates to perform an operation visible on an associated graphical user interface;

monitoring, utilizing the two-dimensional scan, the touch-sensitive interface for an intervening occurrence of a touch input over a length of time; and switching, responsive to a determination that no intervening occurrence of the touch input was detected over the length of time, to monitoring the touch-sensitive interface for an additional occurrence of the touch input by utilizing a one-dimensional scan using a second optical beam pattern different than the first optical beam pattern that includes a particular portion of the plurality of photoemitter and photo detector pairs at a second scan rate and at a second scan resolution.

14. The method of claim 12, comprising:

switching back to monitoring utilizing the two-dimensional scan in response to detecting the additional occurrence; and rescanning the additional occurrence utilizing the two-dimensional scan.

15. The method of claim 13, comprising restarting the length of time for monitoring utilizing the two-dimensional scan in response to detecting the intervening occurrence of the touch input within the length of time.

* * * * *